March 7, 1950  W. NIPKEN  2,499,408
WORK HOLDER

Filed June 2, 1945  3 Sheets-Sheet 1

INVENTOR.
WALTER NIPKEN.
BY

March 7, 1950  W. NIPKEN  2,499,408
WORK HOLDER
Filed June 2, 1945  3 Sheets-Sheet 3

INVENTOR.
WALTER NIPKEN.
BY

Patented Mar. 7, 1950

2,499,408

UNITED STATES PATENT OFFICE 2,499,408

WORK HOLDER

Walter Nipken, Fairlawn, N. J., assignor to Ambrose J. Peraino, Ridgewood, N. J.

Application June 2, 1945, Serial No. 597,353

7 Claims. (Cl. 90—59)

My invention is particularly adapted to position and maintain a work piece in a predetermined position upon a machine table but its utility is not so limited. I provide a sturdy and relatively inexpensive work holder or clamping tool which is simple in construction and in operation by means of which a workman may quickly lock in a desired position a piece of metal or other material upon which a machining or other similar operation is to be carried out. My tool is so constructed that it can be instantly adjusted successively to hold properly in place a plurality of work pieces of different sizes. In one of many practical embodiments of my tool, as I am mentioning merely for purposes of illustration, I provide instantly available gradations of approximately ten one-thousandths of an inch. In this one example only of my invention, therefore, within a total range of approximately one and one-half inches I may secure 128 different rigid clamping positions by adjustments which even an unskilled workman can carry out in a few seconds.

As will be readily understood by those skilled in this art such a holder is applicable to almost all common types of machines (often recently termed "machine tools") which are adapted for changing the form of metal and other materials, such, for example, as milling machines, planers, grinders, shapers, boring mills, drill presses, jig borers, punch presses, face plates, and jigs and fixtures. The present practice in setting up work for such machines is either to improvise a clamp by means of bolts, blocks, plates and shims in various combinations or to apply especially constructed or step blocks or the like in combination with elaborate clamps. The first operation is laborious and time consuming. The second is not satisfactory for the same reasons and also because a large number of different blocks must be kept readily available in order to provide the necessary different elevations of clamping position. Also especially prepared blocks may be employed in combination with each other or in combination with shims, plates and clamps. In any such case the task preparatory to holding a work piece in a desired position is complicated, lengthy and annoying.

The use of my invention overcomes the disadvantages stated above. It makes possible the almost instant locking of a work piece of any size into place. When in use it is positive, firm and does not mar the work table.

In its essence my invention applies a novel combination of simple elements, of which two per se are previously unknown so far as I am aware, to the problem of successively holding work pieces of different sizes upon a work table of a machine tool. A highly important novel member of this novel combination is a rotatable positioning device having attaching instrumentalities or formations disposed at different distances from its center. I illustrate all embodiments of this invention by a positioning member which is narrower than it is broad and with the narrow periphery either circular or polygonal and with one or generally a plurality of openings with axes parallel to the periphery. As such a positioning member is placed upon its narrow side upon a work table and rotated these instrumentalities carried by this member are disposed at different distances from the surface of the work table. Another novel member cooperating with my positioning device is a clamping bar which near one of its ends has means cooperating with one or more of the attaching instrumentalities and near its other end is formed to engage the work piece, co-action between these respective attaching instrumentalities and the clamping bar being effective successively to position the bar at different selected distances from the table thereby making it possible to lock into position work pieces of different dimensions. In one form of my invention I preferably provide means whereby the positioning member and the clamping bar can be fixedly attached at a plurality of points in order to position the bar in parallel relation to the table. In one preferred form of my invention I form the work-engaging end of the clamping bar asymmetrically so that merely by turning it over I may double the numbers of elevations in which a work piece may be clamped into position. Intermediate the two ends of the clamping bar I apply a holding and aligning member which extends upwardly from the table in a direction normal thereto.

I am illustrating this invention in simple forms, but I am not limited thereto. Whether I employ a circular or polygonal positioning member the openings, if I use a plurality, are arranged in a spiral form—that is, at different distances from the center. This member is placed with its narrow side upon a work table and with the axis parallel to the plane of the table and rotated by hand until one or two openings are positioned at a desired height above the table. It is this novel member which makes possible the extreme flexibility as well as simplicity of my tool. Comparatively few openings enable me after the disc has been rotated to position the clamping bar in any one of a large number of different locations above the bed of the work table, each only slightly spaced from another. Thus an extremely fine adjustment is made instantly possible by a simple and sturdy unitary device within which no part is movable relatively to another. Mere bodily rotation of a single solid metallic member is a complete substitute for interlocking parts of a plurality of members, screws, racks, gears and the like.

This positioning member, as previously stated, may be a circular disc or its periphery may be polygonal, for example only, hexagonal. If the attaching openings, which are arranged in a spiral pattern at different distances from the periphery, are cylindrical and the periphery is circular, I pass pins through two openings to hold the disc firmly in place. If the openings are non-circular I employ one only but with a square sided pin. If the periphery is polygonal, use of one round opening at one time is sufficient. A great advantage of the disc with two round openings is the rapidity with which it can be brought to and locked in its proper position.

Although I prefer to rotate the positioning member as previously stated I may employ it without rotation. That is to say without previous rotation I may attach a clamping bar to any one of various openings and depend solely upon the distance between that opening and the table for establishing the height of the bar above the table. Generally, however, I prefer to rotate the positioning member. It will be understood that when I so use my device in that preferred manner the positioning opening which I employ will be in vertical alignment both with the table and normal thereto and will pass through a substantial portion of the body of the positioning member which is disposed between the opening and the table. In such cases as I employ a polygonal positioning member a line projected from the chosen opening to the table ordinarily is entirely included within the positioning disc.

The attaching instrumentalities which I show are openings, which cooperate with a pin or pins and suitable slots, later described, in a clamping bar. Other suitable formations and means to join the various parts may be employed.

A clamping bar, attachable to this positioning member, is equally simple and positive. The end of this bar which is to be attached to the positioning member may be bifurcated to embrace the disc and be formed with a horizontal slot to receive a pin or pins which can be placed within the openings in the positioning member to fix it and bar together. The other end may be provided with a formation or nose which engages the work piece. In one form of the invention this nose is made with its opposite work-engaging faces at different distances from the projection of the plane of the horizontal slot. Thus, as the bar is turned over (rotated through 180 degrees about its longitudinal axis), one face engages the work at a distance from the table different from that at which the other face engages it, the slot being in the same position in each instance. Intermediate the ends of the clamping bar is a vertical slot for the reception of the holding member.

This holding member is a conventional bolt or the like extending above the bed of the table normal thereto and slidable in a slot in the bed. I place the positioning member, if cylindrical, upon the work table of a machine, the openings being arranged with their axes parallel to the table, suitably spaced from the work piece. I thereupon place the work holding nose or face of the positioning member upon the work piece which is placed upon the table with the holding member passing through its slot and the disc through the bifurcations, and by eye adjust the clamping bar to its proper height, in which its longitudinal axis is parallel to the table. I thereupon rotate the disc by hand until an opening (or two openings depending upon the form of the invention) are aligned with the vertical slot. I join positioning member and clamping bar by slipping a pin or pins through the slot and opening or openings. Thereupon I tighten the nut on the holding bar, self aligning washers providing for any slight irregularity. Thus the work piece is clamped into its proper position. The whole operation requires literally only a few seconds. The use of a positioning member with a polygonal table-engaging surface is similar. I may, however, use a polygonal positioning member with a clamping bar pivotally attached at a fixed point not at the center. As the member is rotated and different flats placed upon a table the clamping bar is differently spaced from the table.

The objects of my invention will be evident from the above general explanation as well as from the specific description which follows. These objects include the provision of a simple unitary work holder or clamping tool which may be instantly adjusted to a plurality of different closely adjacent positions and when so adjusted firmly and effectively holds a work piece in position without injury to a work table. Although I am showing a preferred form only of my invention for purposes of illustration it will be understood that changes can readily be made without departing from the scope of by broader claims or the spirit of my invention.

In this specification and in the appended claims words denoting position, such as "above" and "below" and "upper" and "lower" and the like, except as noted, are to be taken in relation to a work table of a machine and of a workman using it.

Figure 3:
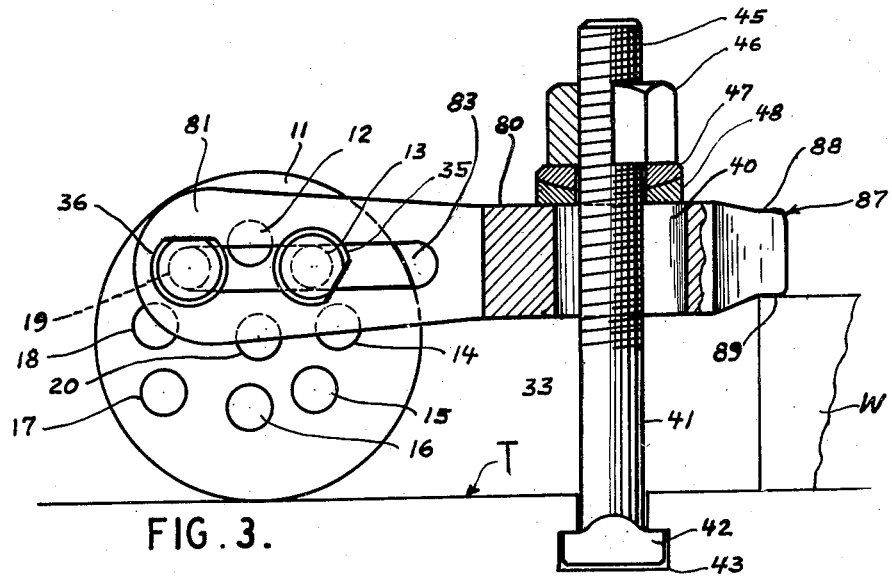
Figure 3 is a side elevational view partly broken away and in section showing my work holder with a reversible nose applied to a work piece which extends relatively far from the table.
Figure 4:
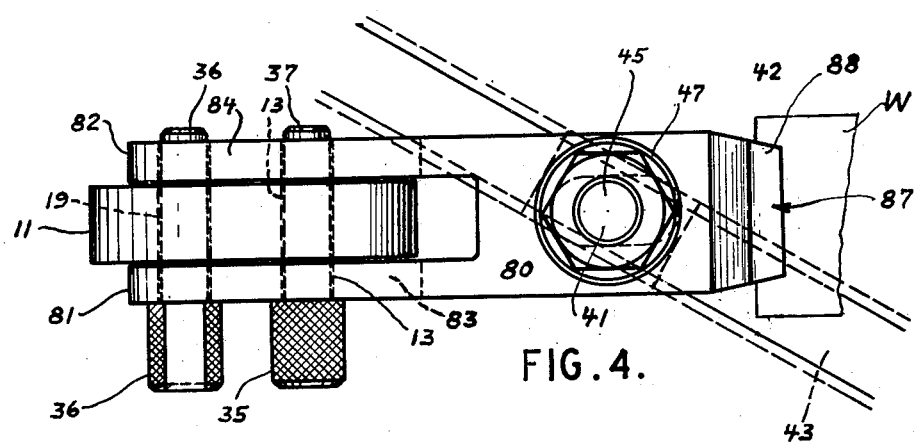
Figure 4 is a top plan view corresponding to Figure 1.
Figure 5:
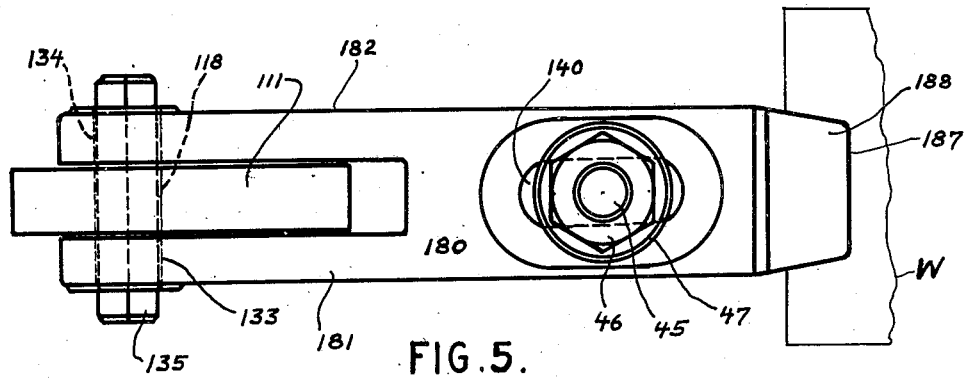
Figure 5 is a top plan view corresponding to Figure 4, in large part.
Figure 6:
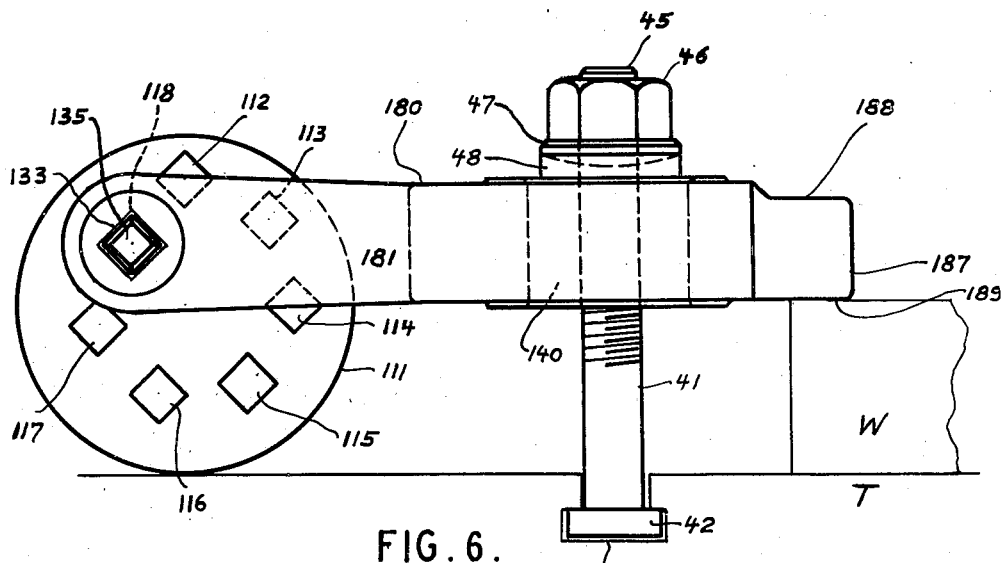
Figure 6 is a side elevational view corresponding to Figure 5. In the form of my invention shown in Figures 5 and 6 I employ a circular disc with non-circular openings, the work holder being shown as applied to a work piece which does not extend far above the table.

As made clear in the preliminary portion of this specification the positioning member and the clamping member which are characteristic of my invention may take several forms. The positioning member may be a disc preferably steel and hardened the circular edge of which engages the table of the machine. In this disc there may be formed a series of openings each differently spaced from the table-engaging edge two of which cooperate with an elongated slot in a clamping bar. Such a disc is shown in Figures 1, 2, 3 and 4. Two pins are required to hold the work holder firmly in place. As shown in Figures 5 and 6, however, I may substitute a disc with non-circular openings, square for example, whereby only one disc and pin are required to hold my tool at any wanted elevation.

Figure 8:
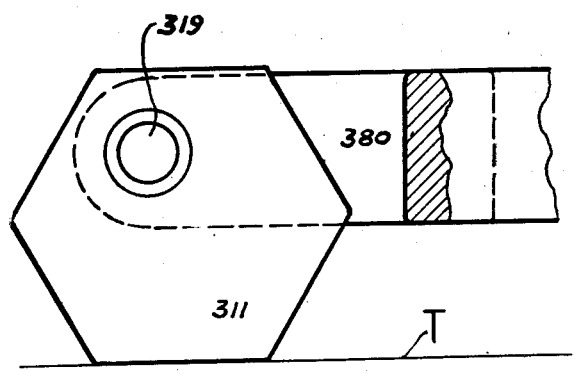
Figure 8 (sheet 2) is a fragmentary elevation partly broken away showing a hexagonal positioning member having one circular opening only. In this instance, a clamping bar is attached for rotation about one axis.
Figure 7:
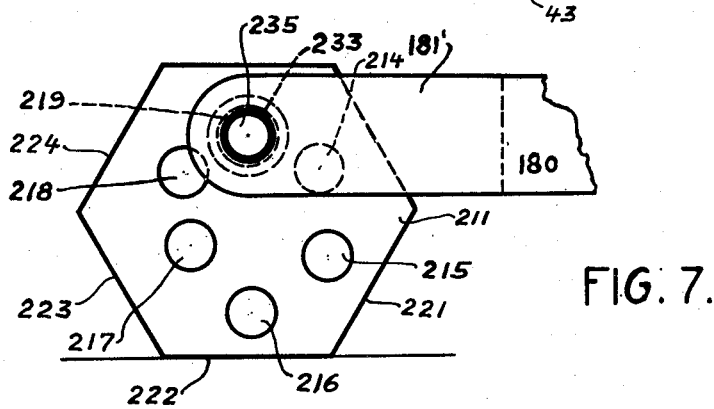
Figure 7 is a fragmentary elevation showing a hexagonal positioning element having a plurality of cylindrical openings.

As shown in Figures 7 and 8 I may form my positioning member with a series of flats upon its table-engaging edge so that only one circular opening and pin are necessary to hold it in place. As shown in Figure 7, I supply a member with a plurality of such openings and in Figure 8 a member with but one. It will be understood that in the form of my invention shown in Figure 7 the distance at which the work piece is held above the table is determined both by the distance between the particular opening which is employed and the center of the member and the distance between the polygonal side which rests upon the table and the pin. Thus the example shown in Figure 7 provides 36 different adjustments.

Figures 1, 2:
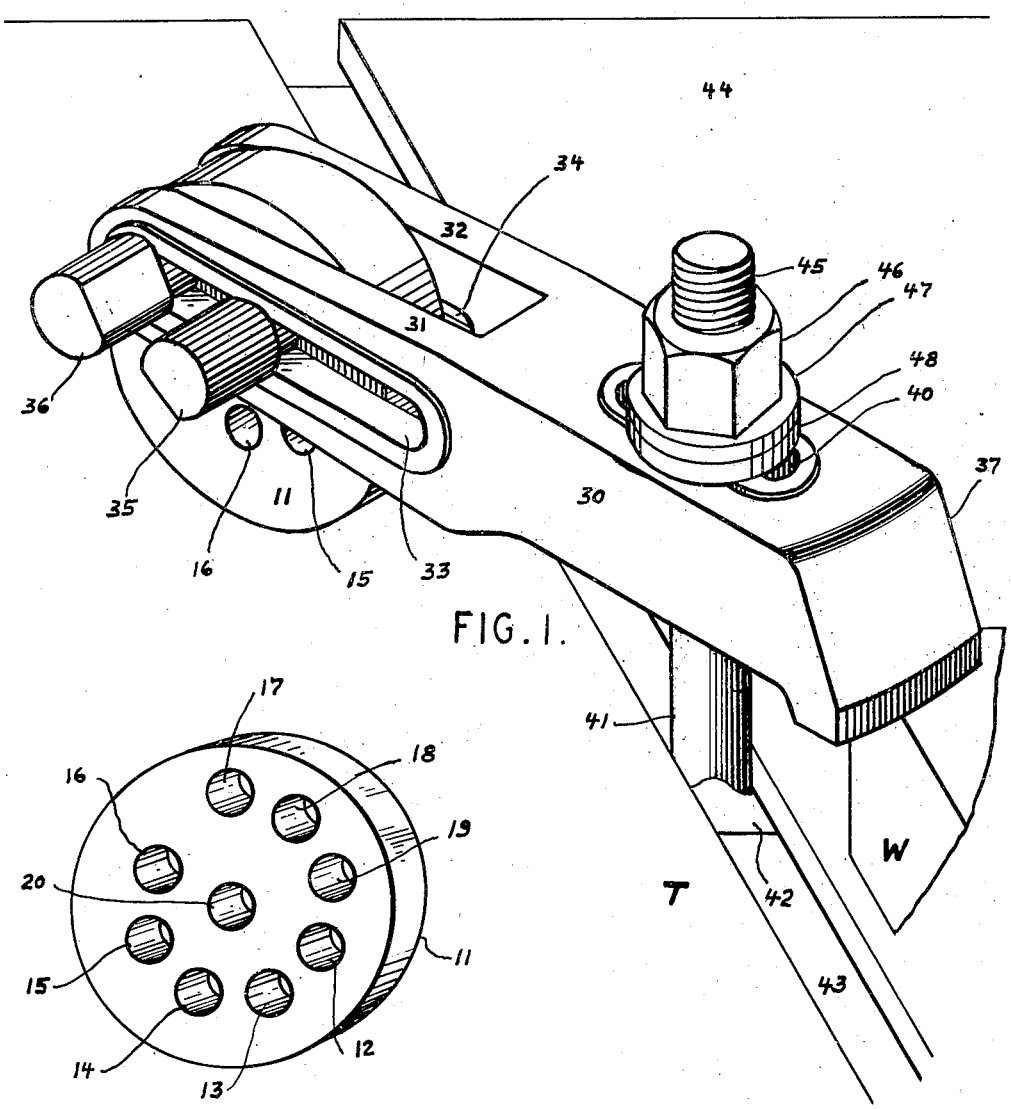
Figure 1 is an isometric view of a preferred form of my invention wherein I employ a circular disc with cylindrical openings, two cylindrical pins for cooperation therewith, and a clamping bar having a single faced irreversible nose piece.
Figure 2 is a similar view of a control member in the form of a disc with cylindrical openings.

The clamping member may be formed with a single nose as shown in Figure 1 or reversible nose as shown in Figures 5, 6, 7 and 8 thus doubling the number of possible adjustments. One form of this latter embodiment of my invention is shown in Figures 3 and 4 and another form is shown in Figures 5 and 6.

In actual practice my tool is sold as a complete unit but preferably with a plurality of interchangeable parts. Such parts may be purchased separately and at different times. Thus a user may provide himself at the same or different times with the clamping bars of Figures 1, 3 and 5 respectively for selective use with the positioning members of any of those figures or of Figure 7. Also I may provide positioning members having different numbers and styles of openings for successive use with the same or different clamping bars. Thus a user may employ a disc with many openings or with few, or a reversible or an irreversible clamping bar. Since I may separately make use and sell each of the novel elements of my novel combination its usefulness and versatility are much increased.

In the form of the invention shown in Figures 1 to 6 positioning disc 11, preferably a drop forging or a steel casting, is truly cylindrical in its narrower dimension. As shown in Figures 1 to 4, this disc is pierced by a plurality of identical cylindrical openings indicated by the reference characters 12 to 20 inclusive, the axes of these openings being parallel to the axis of the cylinder. See Figure 2 which shows this disc alone. These openings are arranged asymmetrically or in a roughly spiral form so that each is disposed at a different distance from the periphery of the disc. Thus as the disc is rotated upon a work table each pair of openings is brought to a different distance above the bed of the table and with their axes parallel to the bed. In the form of my work holder which I present solely for purposes of illustration the openings, which are shown as only nine in number, furnish 64 or 128 different adjustments, this difference being explained later. It will thus be seen that the number of adjustments possible with larger discs having more openings is almost unlimited so that the differences between successive combinations of openings can be extremely minute. It will therefore readily be seen that this essential and characteristic unit of my invention is most simple in design and construction as well as in operation and relatively inexpensive to manufacture. I may furnish many different discs with different numbers and arrangement of openings for use with the same or different clamping bars.

In the embodiment of my invention which I am showing in Figure 1 one end of a clamping bar 30 is bifurcated and has branches 31 and 32. Vertical and aligned slots 33 and 34 are formed for the reception of positioning pins 35 and 36. The other end of this clamping bar is fashioned into a jaw 37 which engages a work piece W. In a central portion of the clamp and aligned with the bifurcation and intermediate it and the jaw a vertical slot 40 is provided for the reception of a holding member or bolt 41.

This bolt may be provided at its lower end with a T formation 42 which coacts with a correspondingly formed T-slot 43 in a bed 44 of the table T. This bolt includes an upper threaded portion 45 as will be clear from Figure 1 which coacts with a nut 46. Between the nut and the clamp use may be made of a self centering device comprising two adjacent and coacting washers 47 and 48 respectively which are formed with cooperatingly curved surfaces but with their relatively distant faces square as shown in detail in connection with similar parts of Figures 3 and 4.

The operation of my device will be evident from the foregoing portion of this specification. First a work piece W is placed in position upon the table T, with bolt 41 in position. Next disc 11 (or any other of my discs as desired) is placed upon its cylindrical surface in contact with the table and in alignment with the bolt and clamping bar 30. This bar is lowered into place so that the bolt 41 enters opening 40 with the bar held parallel to the table and the disc is positioned within the bifurcation and rotated until two selected openings are aligned with vertical slots 33 and 34. A workman slips pins 35 and 36 into position. He then tightens bolt 46. Any difference in height between the work piece and the positioning member will be taken up by the bevelled washers 47 and 48 and the clamping bar will thereupon be in alignment with the work piece with its longitudinal axis parallel to the table. The set-up is then complete—in literally a relatively few seconds.

Figures 3 and 4 illustrate another embodiment of my invention.

Disc 11 is shown with cylindrical openings and the pins 35 and 36 which cooperate with them in a form similar to that previously described. A reversible clamping bar 80 which I employ in this embodiment of my work holder differs in the formation of its jaw. Its two work-engaging surfaces are differently spaced from its longitudinal axis so that by turning it over the number of possible adjustments is doubled. It will be understood my several clamping bars may be used interchangeably. They are sold separately.

I have found it desirable to make clamping bars of different lengths to accommodate different machining operations, as well as to provide bars of different size adapted to light or heavy work. Each different bar, however, can be used with the same or different positioning members.

One end of this clamping bar 80 is formed with a bifurcation having branches 81 and 82. In these bifuractions horizontal and aligned slots 83 and 84 are formed for the reception of positioning pins 35 and 36. The other end of the clamping bar is fashioned into a jaw or head generally indicated as 87 which has two opposite faces 88 and 89 which are adapted successively to engage a work piece W. These faces are differently spaced in relation to the longitudinal axis of the clamping bar and the projection of the plane of the pin receiving slots 83 and 84. Consequently it will be understood that when face 89 engages a work piece as shown in Figures 3 and 4 the elevation will be greater than when the bar is turned over or rotated on its longitudinal axis through 180 degrees and face 88 engages the work piece. That is to say, face 89 will accommodate a higher work piece than face 88. This arrangement doubles the number of adjustments which can be made with a single positioning disc. In a central portion of the clamp within the bifurcation and the jaw vertical slot 40 receives a holding member. The structure and arrangement of the holding member and associated parts and their relation to the clamping bar are as before described.

As will be clearly evident from a consideration of Figures 5 and 6 I may form my positioning member as a disc 111 of the general characteristics of that which is shown in Figures 1 and 4 but with openings, to which the reference characters 112 to 118 both inclusive have been applied, which are non-circular in cross section. As shown in the drawings for purposes of illustration only these openings are square in cross section but they may be triangular, hexagonal, or otherwise polygonal, or may be formed with a key way. Openings 133 and 134, similar in shape and size to those in positioning disc 111, receive a single pin 135 when a clamping bar, about to be described, is put into position. In the above mentioned figures I show a square pin successively cooperating with the square openings but if I use non-circular openings of other cross sectional characteristics I of course form the pin with a cross section to correspond with that of the opening. In any case it is preferable that the pin and the opening which receives it be constructed for a push fit so that there is little if any play.

A clamping bar 180 in general corresponds to clamping bar 80 previously described. This bar terminates in bifurcations 181 and 182 for the reception of disc 111 and is pierced with the aligned openings 133 and 134.

The holding member which I employ with this form of my invention is the same as that shown in connection with the other embodiments thereof. Also the method of operation is exactly the same.

It will be noted that the nose 187 is formed differently from the nose 87 of Figures 3 and 4. The lower face 189 as viewed in these figures is formed in alignment with the lower surface of the clamping bar 180 while the upper face 188 is formed below the surface of the upper edge of the clamping bar as so seen.

Alternatively to the construction shown in Figures 5 and 6, the aligned openings 133 and 134 in the branches 181 and 182 of the bifurcation in clamp 180 for the reception of pin 135 may take the form of elongated slots instead of an opening of approximately the cross section of the pin. That is, the slots of bars 30 and 80 may be used equally well with the positioning members 11 and 111 (and 211 later described). In this case, however, except in rare instances the slot will engage only the corners of the pin and hence give less bearing surface. Since both parts are preferably hard this apparent disadvantage is not serious and may be outweighed by the fact that a slot of considerable length permits somewhat greater freedom in placing disc 111 in a line parallel to the bed of the table. The great advantage of this construction is that it permits the same clamping bar selectively to cooperate with positioning members, circular or non-circular in cross section having circular or non-circular openings.

In another embodiment of my invention I may form a positioning member 211 with a series of cylindrical openings designated as 215 to 220 both inclusive together with a series of flats 221 to 226 both inclusive formed in the edge of this member which engages the table. In the form of my invention as shown in Figure 7 the positioning member is hexagonal. Although in most respects I have found a six sided surface particularly efficient other forms may be used as desired. Aligning openings of which but one designated as 233 is shown are formed in bifurcation branches 181' (and a corresponding one not shown) formed in a clamping bar 180' which corresponds to bar 180 (or 30) previously described. The advantage of this type of work holder is that I join the easy positioning which follows the use of a cylindrical pin in a cylindrical hole and the necessity for employing but one pin to the rigidity which comes from the cooperation of a flat table-engaging surface and a single holding member. It will be understood that this rigidity does not depend upon the configuration of pin and opening or a close fit therebetween. This form of my invention gives two variables of adjustment—that of the opening wherein the clamp is placed and the particular side which rests upon the table.

Figure 8 shows a very simple and inexpensive but less versatile embodiment of my invention wherein I employ a positioning member 311 having flats, corresponding to those previously described in connection with member 211, formed in its edges which engage a work table. A pintle 319 pivotally supports the bifurcated end of a clamping bar 380 thereby attaching it at one point only to the positioning member 311. It should be especially noted that in this form of the invention I employ only one point of connection between the positioning member and the clamping bar. Since otherwise the construction of the clamping bar 380 corresponds to that of any one of the bars 30, 80, 180 and 180' it is not necessary to describe or illustrate in detail. Similarly since the positioning member 311 is similar to that of member 211 it is not described in detail. As different flats are successively placed upon a work table a member 311 is rotated and the distance of bar 380 from the table is changed.

The advantages of my invention will be clear from the foregoing specification, the drawings which are a part hereof and the sub-joined claims. These advantages include the provision of a simple, inexpensive, efficient work holder which can be instantly adjusted to many different positions in each of which it holds work pieces of different sizes and configurations in rigid relation to the work table of a machine. These advantages also include the provision of such a work holder including interchangeable positioning members of different characteristics and different reversible and irreversible work-engaging formations thus providing great flexibility.

I claim:

1. In a work holder for use with a machine having a work table from which a bolt extends, a unitary positioning member one surface of which is adapted to be placed upon a work table, said positioning member embodying a plurality of openings each differently spaced from said surface and with their axes parallel thereto for successively and selectively joining a clamping member thereto, the rotation of said member upon said surface upon the table being effective successively to bring said openings to different predetermined positions above the table, a clamping bar, said clamping bar having one or a first end adapted to cooperate with said positioning member and another or second end adapted to engage a work piece which has been placed upon the table, said first end of said clamping bar embodying at least one opening which can be successively aligned with said openings of said positioning member when said surface of said member rests upon the table and said bar is placed in cooperative relation thereto, and joining means successively cooperating with said opening of said bar and selected openings of said member for detachably connecting said bar and said member at different predetermined vertical distances above the table, said clamping bar and the bolt extending from the table coacting to maintain the work holder in position.

2. In a work holder, a clamping bar, a unitary positioning member adapted to be placed upon a work table with one surface engaging the table, said positioning member embodying a plurality of separate openings extending therethrough differently spaced from said surface and with their axes parallel thereto for successively joining said clamping bar thereto, the rotation of said member upon said surface successively bringing said openings to a plurality of positions in vertical alignment with the table and differently spaced therefrom, said clamping bar being adapted to extend between said positioning member and a work piece which has been placed upon the table and said openings of said positioning member, means for successively detachably connecting to said openings the end of said bar relatively remote from the work piece, and means extending from the table and fixed thereto engaging said bar for maintaining said bar in any of the positions wherein it has been placed.

3. For use in a work holder which includes a clamping bar one end of which is adapted to engage a work piece placed upon a work table and the opposite end of which is adapted to engage a positioning member, a positioning disc in the form of a truncated cylinder having openings disposed at different distances from the circumference and arranged with their axes parallel to the axis of the disc, said disc being adapted to be disposed upon the work table with its cylindrical surface in engagement therewith, and means for selectively attaching the end of said clamping bar relatively remote from said work piece to each of said openings thereby varying the distance between said work piece and the work table.

4. For use in a work holder which includes a clamping bar one end of which is adapted to engage a work piece placed upon a work table and the opposite end of which is adapted to engage a positioning member, a positioning disc in the form of a truncated cylinder having non-circular openings disposed at different distances from the circumference and arranged with their axes parallel to the axis of the disc, said disc being adapted to be disposed upon the work table with its cylindrical surface in engagement therewith, and means complementary to said openings whereby relative angular movement between said disc and said member is prevented for selectively attaching the end of said clamping bar relatively remote from said work piece to each of said openings thereby varying the distance between said work piece and the work table.

5. For use in a work holder, a unitary positioning member having a polygonal surface each flat portion of which upon the rotation of said member is adapted successively to engage a work table of a machine, and said member having formations differently spacer from said flat surfaces and adapted for cooperation with a clamping member, such successive disposition of said member upon each of said flat surfaces being effective to dispose successive of said formations in right angled alignment therewith.

6. In a work holder, a positioning disc in the form of a truncated cylinder, said disc being formed with a plurality of transverse openings disposed at different distances from the circumference of the disc and extending therethrough in a direction parallel to its axis, a clamping bar, said clamping bar including at one end a bifurcation adapted to embrace said disc and a horizontal slot in each branch of said bifurcation, said slots being so arranged that a pin inserted therein when said bifurcation embraces the disc will be in alignment with two of said cylindrical openings, two pins adapted to pass through said horizontal slots and two selected cylindrical openings which by the rotation of said disc have been brought into alignment with said horizontal slots, the end of said clamping bar relatively distant from said bifurcation being formed into a nose which is adapted to engage a work piece, a vertical slot being formed in said clamping bar intermediate its ends for the reception of a holding member, a holding member in the form of a bolt one end of which is adapted to be attached to the work table and another and threaded portion of which relatively distant from said end being adapted to pass through said opening, a nut for locking said holding bolt into holding relation with said clamping member after said holding bolt has been inserted within said horizontal slot in said clamping member, and self aligning washers disposed adjacent each other about said bolt and above said clamping member, the surface of each of said washers relatively remote from the other washer being normal to the longitudinal axis of the bolt and the adjacent surfaces of said washers being cooperatingly curved whereby when said nut is tightened said bolt is aligned with the axis of the opening in said clamping bar through which it passes.

7. In a work holder, a positioning disc in the form of a truncated cylinder, said disc being formed with a plurality of cylindrical transverse openings disposed at different distances from the circumference of the disc and extending therethrough in a direction parallel to its axis, a clamping bar, said clamping bar including at one end a bifurcation adapted to embrace said disc and a horizontal slot in each branch of said bifurcation, said slots being in alignment and so arranged that two pins inserted therein when said bifurcation embraces said disc will be in alignment with two of said cylindrical openings, two pins adapted to cooperate with said hirizontal slots and said openings, the end of said clamping bar relatively distant from said bifurcation being formed into a nose which projects downwardly from the longitudinal axis of the clamping bar and is adapted to engage a work piece, a vertical slot being formed in said clamping bar intermediate its ends for the reception of a holding member, a holding member in the form of a bolt one end of which is adapted to be attached to the work table and another portion of which relatively distance from said end being adapted to pass through said opening, a nut for locking said holding bolt in holding relation with said clamping member after said holding member has been inserted within said vertical slot in said clamping member and said disc has been attached to said clamping bar by said two pins and said nose has been placed in contact with the work piece, and self aligning washers disposed adjacent each other about said bolt and above said clamping member, the surface of each of said washers relatively remote from the other washer being normal to the longitudinal axis of the bolt and the adjacent surfaces of said washers being cooperatively curved whereby when said nut is tightened said bolt is aligned with the axis of the openings in said clamping bar through which it passes.

WALTER NIPKEN.

REFERENCES CITED

The following references are of record in the file of this patent:

UNITED STATES PATENTS

| Number | Name | Date |
|---|---|---|
| 142,697 | Holmes | Sept. 9, 1873 |
| 183,061 | Locke | Oct. 10, 1876 |
| 603,025 | Lord | Apr. 26, 1898 |
| 1,038,044 | Wessell | Sept. 10, 1912 |
| 1,383,707 | Farnum | July 5, 1921 |
| 1,442,664 | Hansen | Jan. 16, 1923 |
| 1,801,222 | Cayo | Apr. 14, 1931 |

FOREIGN PATENTS

| Number | Country | Date |
|---|---|---|
| 111,832 | Switzerland | Sept. 24, 1924 |